(No Model.)
A. BUTTON.
GROCER'S SCOOP.
No. 282,493.  Patented Aug. 7, 1883.
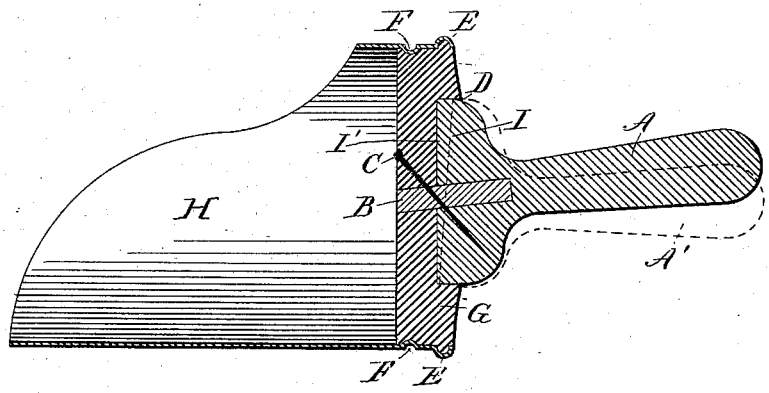
Witnesses.
Inventor.
Alphonzo Button

UNITED STATES PATENT OFFICE.

ALPHONZO BUTTON, OF GRAND RAPIDS, MICHIGAN.

GROCER'S SCOOP.

SPECIFICATION forming part of Letters Patent No. 282,493, dated August 7, 1883.

Application filed September 4, 1882. (No model.)

*To all whom it may concern:*

Be it known that I, ALPHONZO BUTTON, of the city of Grand Rapids, in the county of Kent and State of Michigan, have invented a new and useful Improvement in the Construction of Grocers' Scoops, of which the following is a specification.

The invention relates to the mode of attaching the metallic cup to a wooden head in the construction of scoops of this class, and in the construction and mode of attaching to said head of a wooden handle.

Hitherto in the construction of scoops of this class the cup or metallic band has either been attached to the wooden head by upsetting the edge of the same, forming a narrow inverted flange, which, in attaching the cup to the head, is inserted and forced into a narrow channel turned in the head around its circumference on the outer surface, and otherwise secured thereto about as shown in present device, the head and handle being turned out of an entire block of wood, or by forming a crease or channel in and around the circumference of the metallic cup at the base or end where attached to the head, which crease or channel is formed to correspond and receive a bead turned and raised around the circumference on the upper or outer surface of said head, which is preferably turned out of inch or other suitable lumber, having a circular recess turned in the center for the reception of a hollow and skeletoned iron handle attached and secured by screws. Both of these methods are objectionable—the former because of the great waste of lumber in the use of scantling and square timber necessary in the construction of the head and handle entire, and because of its straight handle turned across grain of timber and liability to break out in falling or from rough usage. The latter mode is also objectionable in the construction and attachment of the cup to the head by means of the crease or channel formed around the circumference of the metallic cup turned or forced from the inner to the outer surface, to receive the bead turned and raised around the extreme circumference of the wooden head, because of the liability of breaking and scaling off of the enamel; in the use of galvanized iron as a non-corrosive metal in the manufacture of sugar-scoops, and consequent liability of these scales or flakes of poisonous enamel becoming intermixed with sugars and other articles of food; also, in exposing this broken part, and consequent susceptibility to rust and corrode in the use of tin or other enameled metal; also, that in clamping the cup to the wooden head a strap or leather belt is employed in connection with a concaved block of wood and foot-lever, forming a clamp for forcing the cup firmly to the wooden head and the bead turned thereon, which bead and corresponding crease or channel on cup materially prevent the successful operation of the strap or belt obstructing the same, and preventing a more complete and firm connection of the cup with the head; also, the skeletoned iron handle, in connection with the latter objected mode, is particularly and seriously objectionable, because of its receptacle in its openings for refuse and wastage, and because of its excessive heft and expense in its construction and attachment, resulting in impracticability of its manufacture.

The object of this invention is to provide a less expensive, lighter, though more substantial and practicable scoop by its present mode of construction, as an article of manufacture; in reversing the crease or channel in the metallic cup to an inverted channel, thereby turning the broken surface from the outer to the inner surface to be protected by its contact with the wooden head, and in the formation of a corresponding channel in place of the bead turned on the head to receive the inverted channel made on the metallic cup, as a more suitable mode of attachment, and to obviate the wearing and flaking off of the particles of enamel and consequent intermixture with sugar and other substances of food, and the hinderance and obstruction of the bead in clamping the metallic cup to the wooden head, objectionable in the second method; and, finally, in the construction and attachment of a wooden handle, so as to make the same lighter, more firm and substantial, secure in its attachment to the head, not liable to come out by ordinary use or otherwise, thereby producing a lighter, less expensive, and more practical scoop, as an article of manufacture.

The invention consists of inverting the crease or channel made around the circumference of the metallic cup, and the formation of a corresponding channel turned around the outer circumference of the wooden head, to receive the convex side of the inverted crease or channel in cup, in place of the bead heretofore objected to as a mode of attachment; also, in the construction and attachment of a wooden handle to the wooden head in place of the skeletoned iron handle and other handles for scoops of this class, more or less objectionable.

In the accompanying drawing, in which similar letters of reference indicate like parts, the figure is a vertical longitudinal section embodying my invention.

The wooden handle A, (two of which are turned in one piece,) having a shoulder of suitable length formed equidistant from each end of the piece, as shown at D, is separated on a miter at dotted line F, forming two handles having a mitered base, T, by the one act of severance, and attached to the wooden head G by being inserted at the severed and mitered end into a recess, D, turned in the center of the same to receive said handle, as shown, and glued therein, and further secured by a hole bored through the center of the inner surface of the wooden head G on a line parallel with the center of the handle A, and on a miter with the center of the head G, into which is inserted a wooden dowel-pin, B, and glued therein, forming an eccentric action in the event of the softening of the glue, and preventing the turning of the handle in the recess of the head G, otherwise likely to occur. The handle A, head G, and dowel-pin B, constituting the head and handle of my scoop, is finally more effectually secured the one to the other by a nail, C, driven at such an angle as to transfix the several parts, as shown, the cup H being formed of one entire piece of tin or other suitable sheet metal having wings overlapping each other, as shown, at the cross-lining between F and C, and attached to the wooden head G by an inverted crease or channel, F, being formed thereon, the convex side of which channel being inserted into a corresponding channel turned around the outer surface and circumference of the head G, and forced into position by means of a strap or leather belt attached to the inner surface of a concaved wooden block corresponding to the circumference of the scoop, drawn around the same at F and E, and operated by a foot-lever, and, in connection with the block attached to a bench, constitute the clamp, the lap or wings of the cup being otherwise secured by a nail at each end and rivet at the center of lap, about as shown in the otherwise objected modes. If, in the manufacture of said scoop, it should be found to be more preferable to adopt the use of a screw in the attachment of the handles to the heads, I hereby reserve the right so to do without deviation or prejudice to my claim, as in the manufacture of the small sizes I conceive this method to be sufficiently substantial and preferable.

Having thus described my invention, what I claim, and desire to secure by Letters Patent, is—

1. The combination of the handle A and wooden head G, provided with a central recess, D, turned for the reception of a mitered wooden handle, A, and a channel, F, with the metallic cup H, formed with one or more parts having a similar channel as a mode of attachment.

2. In the construction of a scoop, the combination of a wooden head, G, and metallic cup H, with the mitered handle A, recessed and secured to a wooden head by a screw or dowel-pin, B, and nail C, substantially as shown.

3. The wooden handle A, having a mitered base recessed and secured to the wooden head G by dowel-pin B and nail C, substantially as shown and described.

ALPHONZO BUTTON.

Witnesses:
CLARK H. GLEASON,
JAMES L. LEWIS.